(12) United States Patent
Namboodiri

(10) Patent No.: US 9,197,891 B1
(45) Date of Patent: Nov. 24, 2015

(54) SYSTEMS AND METHODS FOR PERIODIC STRUCTURE HANDLING FOR MOTION COMPENSATION

(71) Applicant: Marvell International, Ltd., Hamilton (BM)

(72) Inventor: Vipin Namboodiri, Bangalore (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 411 days.

(21) Appl. No.: 13/721,764

(22) Filed: Dec. 20, 2012

Related U.S. Application Data

(60) Provisional application No. 61/582,472, filed on Jan. 2, 2012.

(51) Int. Cl.
| | |
|---|---|
| *H04N 7/12* | (2006.01) |
| *H04N 11/02* | (2006.01) |
| *H04N 11/04* | (2006.01) |
| *G06K 9/00* | (2006.01) |
| *H04N 19/51* | (2014.01) |

(52) U.S. Cl.
CPC ............. *H04N 19/00684* (2013.01)

(58) Field of Classification Search
CPC ...... H04N 19/56; H04N 19/86; H04N 19/547
USPC .................................................. 375/240.16
See application file for complete search history.

(56) References Cited

U.S. PATENT DOCUMENTS

| | | |
|---|---|---|
| 5,793,430 A | 8/1998 | Hackett et al. |
| 2005/0094852 A1* | 5/2005 | Kumar et al. ............... 382/107 |
| 2010/0008423 A1 | 1/2010 | Namboodiri et al. |

* cited by examiner

*Primary Examiner* — Hee-Yong Kim

(57) ABSTRACT

Systems and methods for estimating motion in an image of a video signal are provided. A plurality of motion vectors for the image are estimated. A segment of the image is identified, where the segment is a portion of the image including a periodic structure. A dominant motion representation of the segment is determined. The dominant motion representation is used to modify certain motion vectors of the plurality of motion vectors.

17 Claims, 9 Drawing Sheets

SYSTEMS AND METHODS FOR PERIODIC STRUCTURE HANDLING FOR MOTION COMPENSATION

CROSS-REFERENCE TO RELATED APPLICATIONS

This disclosure claims priority to U.S. Provisional Patent Application 61/582,472, filed on Jan. 2, 2012, which is incorporated herein by reference.

TECHNICAL FIELD

The technology described in this document relates generally to the field of image generation and more particularly to the use of motion information in the generation of images.

BACKGROUND

Motion information can be an important aspect of image generation. For example, in frame sequences of a video signal, the only difference between one frame and a next frame may be the relative motion of objects within the frames. Video compression may take advantage of this fact by encoding image data for only certain of the frames of the video signal (e.g., encoding image data every fourth frame). For the frames in between the encoded frames, only the information needed to generate the missing frames is stored. Part of the information needed to generate the missing frames is information about the motion of the objects within the frames.

Another example of where motion information can be important occurs when a frame rate of an input signal is inconsistent with a frame rate necessary for an output device. Video is commonly recorded at 24 Hz, 25 Hz, 30 Hz, 50 Hz, or 60 Hz. Commercially-available television displays, on the other hand, have picture rates up to and beyond 120 Hz. To interface recorded video with such a television display, the original frame sequence from the recorded video must be up-converted using, for example, a picture rate converter. The picture rate converter typically operates by interpolating image frames at time instances between the frames recorded by the lower-frequency source device.

In simple picture rate converters, an image is often repeated in the destination display until a next image arrives from the source device, which may result in blur and judder when motion occurs. Motion compensation circuits may be used in picture rate converters to reduce these unwanted effects and achieve a high performance conversion for moving sequences. Motion compensation operates by estimating where objects of an interpolated picture should be located, based on a direction and a speed of movement of those objects. The direction and speed values may then be expressed as motion vectors, which are used to "move" the objects to the estimated positions in a newly generated frame. In motion compensation circuits, the presence of periodic structures in a frame sequence can result in visual disruptions in interpolated images (e.g., temporal discontinuities or breaks in the interpolated images).

SUMMARY

The present disclosure is directed to systems and methods for estimating motion in an image of a video signal. In a method for estimating motion in an image of a video signal, a plurality of motion vectors for the image are estimated. A segment of the image is identified, where the segment is a portion of the image including a periodic structure. A dominant motion representation of the segment is determined. The dominant motion representation is used to modify certain motion vectors of the plurality of motion vectors.

In another example, a system for estimating motion in an image of a video signal includes a motion vector estimation block configured to estimate a plurality of motion vectors for the image. The system also includes a segment identification block configured to identify a segment of the image, where the segment is a portion of the image including a periodic structure. The system further includes a dominant motion detection block configured to determine a dominant motion representation of the segment. The dominant motion representation is used to modify certain motion vectors of the plurality of motion vectors.

In another example, a method of identifying a segment of an image includes detecting periodic structure information for the image using autocorrelation. The periodic structure information includes a pitch value and a confidence value for each of a plurality of regions of the image. A histogram of the pitch values is plotted for the plurality of the regions of the image. The pitch values plotted in the histogram are those having associated weight values above a threshold weight value. A cluster on the histogram is determined, where the cluster includes a range of the pitch values having an elevated number of counts on the histogram. The segment is identified based on the cluster. The segment is a portion of the image including a periodic structure.

DETAILED DESCRIPTION

Figure 1:
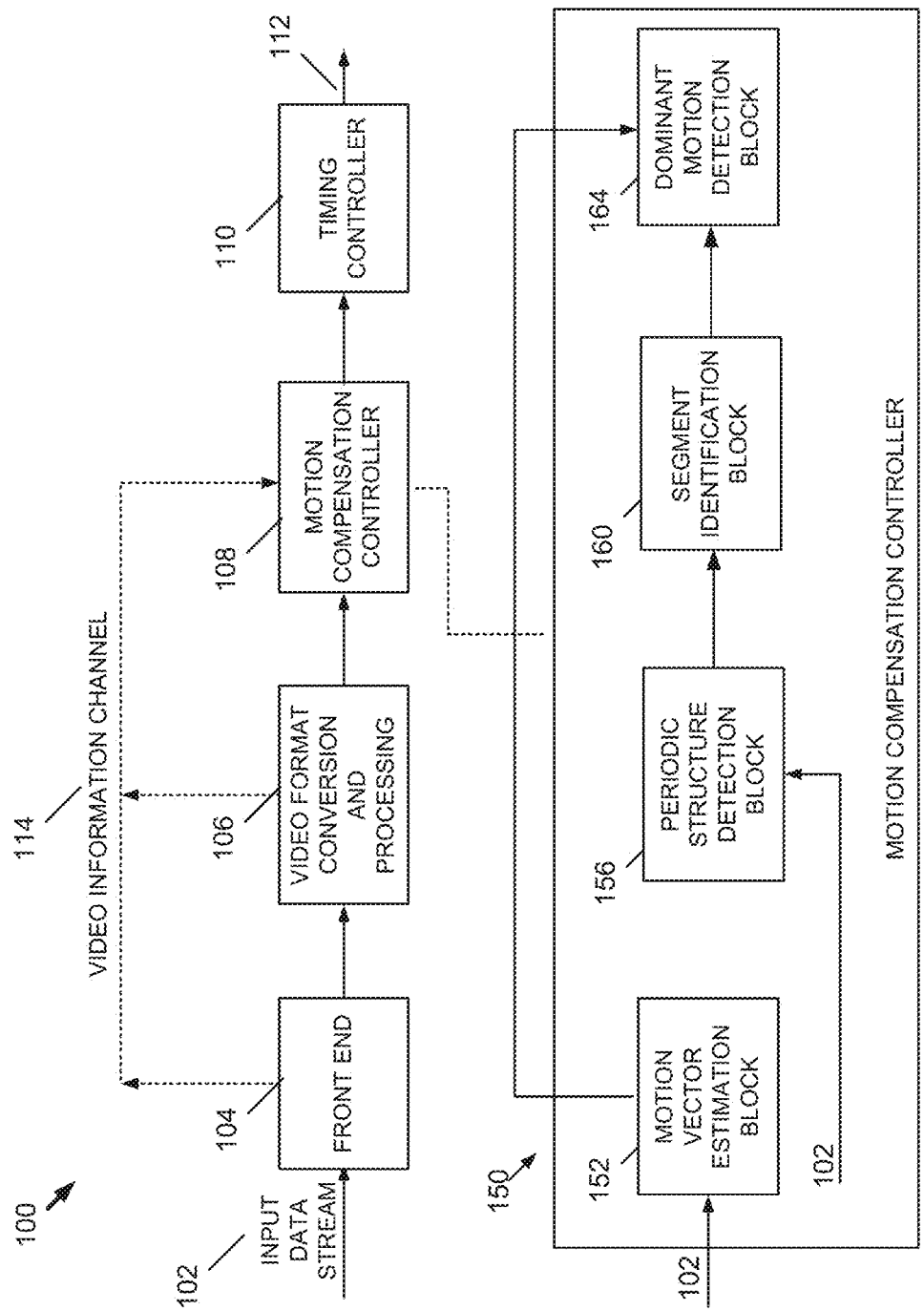
FIG. 1 is a block diagram illustrating an example motion compensation system.

FIG. 1 is a block diagram illustrating an example motion compensation system 100.

An input signal 102 having a discrete sequence of video frames is input to the motion compensation system 100, which produces a motion compensated output signal 112 via modules 104, 106, 108, and 110. In an example, the output signal 112 from the motion compensation system 100 has a frame rate that is higher than a frame rate of the input signal 102. For example, the input signal 102 may be produced from a video camera that has a picture rate of 60 Hz. This video signal may need to be up-converted using the motion compensation system 100 to be suitable for output on a television or computer display having a higher refresh rate (e.g., an LCD panel display having a refresh rate of 120 Hz). In general, frame rate up-conversion is achieved by generating and inserting a predetermined number of frames between each pair of temporally adjacent input frames of the original sequence of video frames. These intermediate frames may be generated in a manner so as to approximately capture motion trajectories of objects between the pair of temporally adjacent input frames, thereby enhancing an overall smoothness of the video image sequence as the sequence is displayed after up-conversion.

With reference to FIG. 1, the input signal 102 is first processed by a front-end module 104. The front-end module 104 may contain components including tuners, demodulators, converters, codecs, analog video decoders, and the like. An output from the front-end module 104 is passed to a video format conversion and processing module 106, which may apply additional video enhancements (e.g., reducing analog noise and compression artifacts, scaling, OSD blending, color management). A resulting output of the video format conversion and processing module 106 is passed to a motion compensation controller 108, which produces an output that is processed by a timing controller 110 before being propagated as the output signal 112.

The entire motion compensation system 100 illustrated in FIG. 1 may be implemented on a single chip in hardware or in software. In one example, a motion compensation chip may be incorporated into television circuitry such that an up-converted, post-processed output of the motion compensation chip is transmitted to an external display panel. The motion compensation system 100 of FIG. 1 may also be implemented on a plurality of chips, with the front-end module 104 and the video format conversion and processing module 106 being fabricated on one chip and the motion compensation controller 108 and timing controller 110 being fabricated on a second chip. Additional chip combinations of the elements of FIG. 1 may also be implemented.

As illustrated in FIG. 1, a video information signal path 114 is provided to facilitate the transfer of information between the elements in the motion compensation system 100. In particular, information that may be conveyed to the motion compensation controller 108 includes, for example, a position of a closed-captioned display, a presence of an on-screen display, a native frame rate of the input signals, and an origin and active video boundaries of the input signals.

In motion compensation circuits, the presence of periodic structures in an input frame sequence can result in visual disruptions (e.g., temporal discontinuities or breaks in interpolated images) in an output video signal. Such visual disruptions can be seen when the output video is viewed at normal speed and may hamper the resultant picture quality of the output video. Specifically, the periodic structures can result in incorrect motion vectors being registered by the motion compensation circuit, which may cause the visual disruptions in the output. To address issues caused by the periodic structures, the motion compensation controller 108 of FIG. 1 includes mechanisms to detect and to handle the periodic structures. The mechanisms are used to eliminate, correct, or sufficiently de-prioritize motion vectors that were incorrectly registered, thus eliminating the visual disruptions that would otherwise be apparent in the output video.

Aspects of the motion compensation controller 108 configured to detect and handle the periodic structures in an image of the input frame sequence are illustrated at 150. The motion compensation controller 108 includes a motion vector estimation block 152, which is configured to estimate a plurality of motion vectors for the image. Due to the presence of the periodic structure in the image, certain of the estimated motion vectors may be incorrect. The motion vector estimation block 152 may use a phase plane correlation (PPC) system or other system to estimate motion in the image and generate the motion vectors. The PPC system receives as input the edge map pixels of the image (e.g., 1-bit edge maps of input luma) and generates one or more candidate motion vectors for each block of the image (e.g., each 64 pixel×32 pixel block of the image). Specifically, in producing the one or more candidate motion vectors for the blocks of the image, the PPC system may generate a two-dimensional phase plane correlation surface for each block of the image, where a peak on the surface corresponds to a candidate motion vector for the block.

Figure 2:
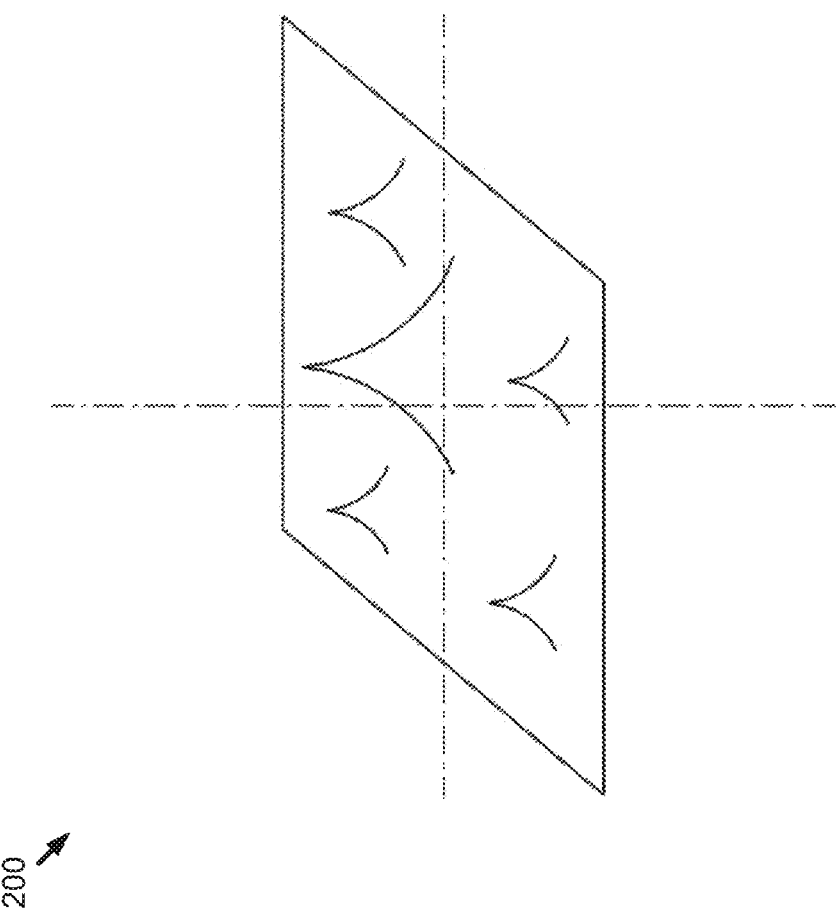
FIG. 2 is an example of a two-dimensional phase plane correlation surface identifying motion between a previous frame and a current frame of a frame sequence.

An example of a two-dimensional phase plane correlation surface 200 is illustrated in FIG. 2. The phase plane correlation surface 200 may be viewed as a contour map identifying motion between a previous frame and a current frame of the input video signal. The locations of peaks on the phase plane correlation surface 200 correspond to motion within the input video signal. Specifically, the locations of the peaks on the surface 200 are used to produce the candidate motion vectors generated by the motion vector estimation block 152, with each of the peaks corresponding to a particular candidate motion vector. The height of a peak on the phase plane correlation surface 200 indicates a correlation value of the peak. The phase correlation peaks of the phase plane correlation surface 200 may be discrete and not continuous.

In instances where two or more candidate motion vectors are detected for a particular block (i.e., the phase plane correlation surface associated with the block includes multiple peaks), a dominant motion vector is selected from the candidate motion vectors. The dominant motion vector is used in subsequent processing of the block, and the other candidate motion vectors for the block may be disregarded (i.e., the dominant motion vector is considered to be the true motion vector of the block). In an example, a candidate motion vector associated with a peak of the correlation surface 200 having a largest correlation value (i.e., a highest peak) is selected as the dominant motion vector for the block. This method of selecting a dominant motion vector for subsequent processing of the block may be suitable in many applications. However, when performing motion compensation for frame sequences that include images containing periodic structures, the dominant motion vector selected using this method may not be the true motion vector for the block. If the dominant motion vector that is not the true motion vector is used in further processing of the block, visual disruptions may be visible in the output video signal.

In the motion compensation controller 108 of FIG. 1, the modules 156, 160, and 164 are configured to eliminate, modify, or sufficiently de-prioritize motion vectors that were estimated incorrectly due to the presence of periodic structures. A periodic structure detection block 156 is configured to detect periodic structure information for the image and to output the periodic structure information to a segment identification block 160. The periodic structure detection block 156 may determine an autocorrelation of the image to detect the periodic structure information for the image. Specifically, the periodic structure information includes a pitch value and a weight value for each of a plurality of regions of the image, where the weight value indicates a confidence in the detected pitch value. In an example, the periodic structure information 158 is output for each region of the image in which a periodic structure is detected. Portions of the image not including a periodic structure may either have no periodic structure information detected by the periodic structure detection block 156 or may be associated with periodic structure information having low weight values (i.e., indicating that the associated pitch value is not likely a true pitch of a periodic structure and that the associated pitch value may be due to noise).

The segment identification block 160 receives the periodic structure information and uses the periodic structure information to identify one or more segments of the image. The identified segments are portions of the image including a periodic structure of a particular pitch value or range of pitch values. As an example, an image may depict two grating structures, where one of the grating structures has a periodicity of approximately 40 pixels (e.g., a range of pitch values from 36 pixels to 44 pixels) per period in the Y direction, and the other grating structure has a periodicity of approximately 25 pixels (e.g., a range of pitch values from 22 pixels to 28 pixels) per period in the X direction. In processing the image, based on the periodic structure information determined by the periodic structure detection block 156, the segment identification block 160 may identify two segments within the image. One segment includes a portion of the image including the 40 pixel/period grating in the Y direction, and the other segment includes a portion of the image including the 25 pixel/period grating in the X direction. As discussed in further detail below, the segment identification block 160 may determine the segments by plotting a histogram of the periodic structure information and identifying clusters on the histogram that correspond to the segments.

A dominant motion detection block 164 receives the identified segments of the image. The dominant motion detection block 164 determines a dominant motion representation for each of the received segments and uses the dominant motion representation to modify motion vectors that were incorrectly estimated by the motion vector estimation block 152. The incorrectly estimated motion vectors may be identified during a sparse motion vector refinement process. In one embodiment, the dominant motion representation is determined using random sample consensus (RANSAC) to compute an affine transform that best fits the segment, and the affine transform that best fits the segment is used to modify the incorrect motion vectors.

Figure 3:
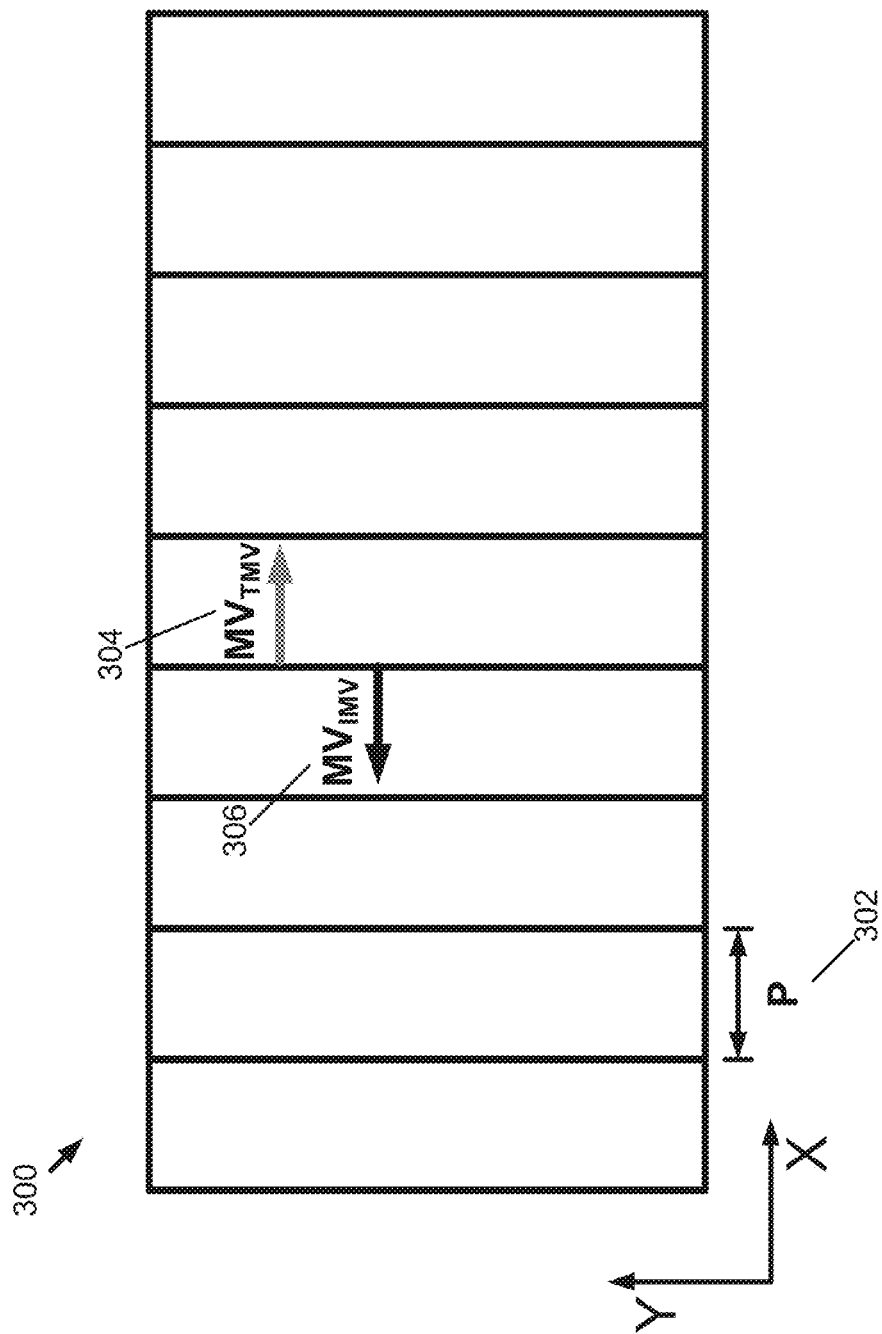
FIG. 3 depicts a vertical pattern having a periodic structure in an X direction.

FIG. 3 depicts a vertical pattern 300 having a periodic structure in an X direction. The vertical pattern 300 may be a portion of an image of a video signal. As noted above, in motion compensation circuits, the presence of such a periodic structure may result in visual disruptions (e.g., temporal discontinuities or breaks in interpolated images) due to the registering of incorrect motion vectors for the image. The vertical pattern 300 of FIG. 3 includes a period of "P" pixels 302. A motion compensation circuit configured to determine motion vectors for the image containing the vertical pattern 300 may output both an $MV_{TMV}$ 304 true motion vector and an $MV_{IMV}$ 306 incorrect motion vector. The $MV_{IMV}$ 306 incorrect motion vector is equal to $MV_{TMV} \pm k \times P$, where k is an integer value. As illustrated in FIG. 3, the true and incorrect motion vectors 304, 306 may be in directions that oppose one another, such that interpolated images produced using the opposing motion vectors 304, 306 may result in the visual disruptions.

Figure 4:
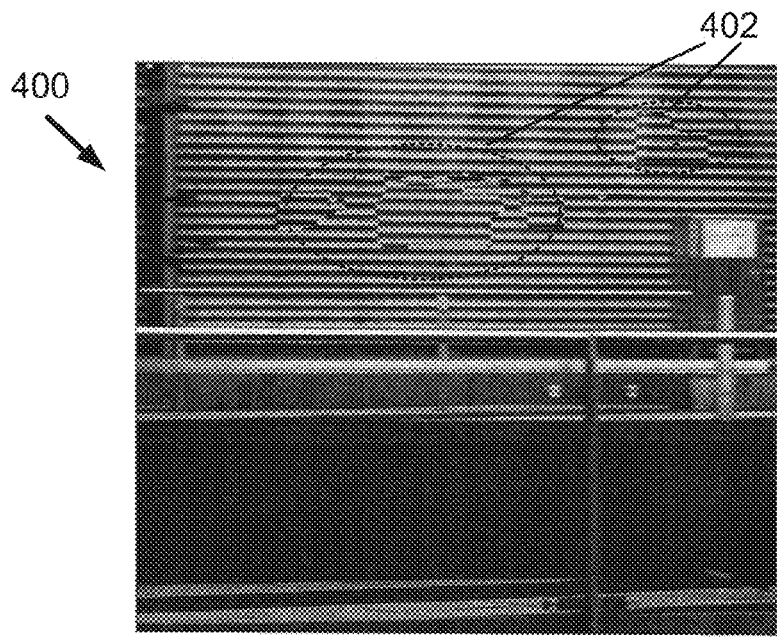
FIG. 4 depicts visual disruptions (i.e., discontinuities or breaks) present in interpolated frames of a frame sequence caused by a presence of a periodic structure.
Figure 4:

An example of the visual disruptions that may be caused by periodic structures in motion compensation circuits is illustrated in FIG. 4. At 400, an interpolated image produced by a motion compensation circuit includes multiple visual disruptions 402 caused by a periodic structure of the image. The periodic structure of the image is periodic in the vertical direction and results in temporal discontinuities (i.e., breaks) 402 visible in the image 400. The motion compensation circuit may produce the visual disruptions 402 during a process of up-converting an original frame sequence to allow the original frame sequence to be displayed on a television display (e.g., up-converting a frame sequence shot on a 60 Hz video camera to be displayed on a 120 Hz television display). With reference to FIG. 3, the visual disruptions 402 may be produced as a result of an incorrect motion vector 306 being registered by the motion compensation circuit.

FIG. 4 also depicts an interpolated image 440 that was produced using a motion compensation circuit configured to handle the periodic structures of the image (e.g., the motion compensation system 100 of FIG. 1). The motion compensation circuit used to produce the interpolated image 440 of FIG. 4 may detect the periodic structure of the image and correct motion vectors that were registered incorrectly. In particular, the motion compensation circuit may identify a segment of the image including the periodic structure and perform further processing on this segment to identify a dominant motion representation of the segment. The dominant motion representation may be used to modify the incorrect motion vectors. In the example interpolated image 440 of FIG. 4, the identified segment would include much of the upper half of the image (i.e., the grating structure included in the image). Most of the lower half of the image would not be included in the segment, as this portion of the image does not include a periodic structure.

Figure 5:
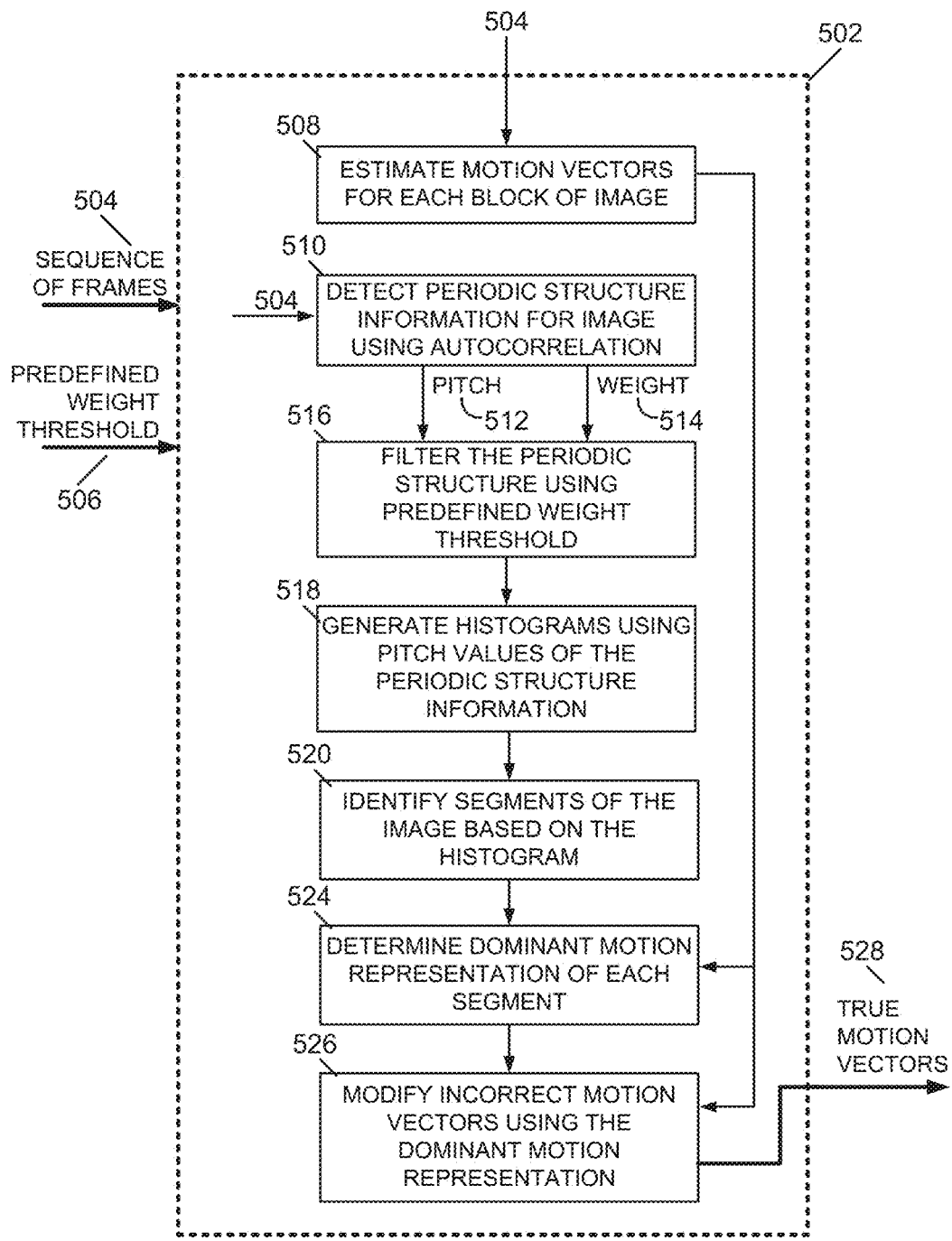
FIG. 5 depicts example steps performed by a motion compensation controller that is configured to handle periodic structures in a sequence of input frames.

FIG. 5 depicts steps performed by an example motion compensation controller 502 that is configured to handle periodic structures in a sequence of input frames 504. In FIG. 5, the motion compensation controller 502 is configured to receive the sequence of frames 504 and to detect motion between frames of the sequence 504, such that interpolated images may be inserted between certain frames of the sequence 504. As described above, the sequence of frames 504 may include one or more images having periodic structures. If not handled sufficiently by the motion compensation controller 502, the periodic structures can cause visual disruptions in the interpolated images. To handle a periodic structure, the motion compensation controller 502 identifies a segment of an image (i.e., a particular portion of the image) including the periodic structure and performs a mathematical operation on the segment. The mathematical operation may be an affine transform that is used to detect a dominant motion representation of the segment. Using the dominant motion representation of the segment, true motion vectors 528 of the segment can be registered, thus eliminating potential issues that may be caused by the periodic structure.

Specifically, in FIG. 5, the sequence of frames 504 is received by the motion compensation controller 502. At 508, the motion compensation controller 502 estimates motion vectors for each block of an image of the sequence of frames 504. Each block may be, for example, 64 pixels×32 pixels in size, and the entire image may be divided into blocks of this size. The motion vectors may be estimated using the phase plane correlation (PPC) method described above with respect to FIG. 1 or another suitable method. Due to the periodic structure included in the image, certain of the estimated motion vectors may be incorrect. For example, a dominant motion vector identified for a block may not be the true motion vector for the block, despite the fact that the dominant motion vector is associated with a highest peak of a phase plane correlation surface produced by the PPC method.

To eliminate, modify, or de-prioritize the incorrectly estimated motion vectors, further processing is performed by the motion compensation controller 502. At 510, periodic structure information for the image is determined using detected autocorrelation values for the image. The periodic structure information includes a pitch value 512 and a weight value 514 for a plurality of the blocks of the image. The weight value 514 is a confidence value, such that a higher weight value 514 indicates a higher confidence in a presence of a periodic structure having the detected pitch value 512. The autocorrelation values for the image are used to determine the pitch value 512 and the weight value 514 as follows. The horizontal and vertical directions where a correlation peak is detected on an autocorrelation phase plane correlation surface correspond to the pitch value 512, and a correlation value itself (i.e., a height of the correlation peak) corresponds to the weight value 514. Registrations with low weight values 514 imply a presence of a weak periodic pattern or noise that inadvertently causes a false periodic structure to be detected. The detected pitch value 512 may be a harmonic of an actual pitch value of a periodic structure, and a harmonic analysis of the correlation peaks of the phase plane correlation surface may be used to detect a fundamental pitch of the periodic structure. The pitch values 512 include detected pitches in both the horizontal and vertical directions, depending on whether the periodic structure exhibits periodicity in the vertical or horizontal direction.

At 516, the detected periodic structure information is filtered using a predefined weight threshold 506. The predefined weight threshold 506 may be an input value received by the motion compensation controller 502, as depicted in FIG. 5, or the predefined weight threshold 506 may be a value determined by the motion compensation controller 502 based on an analysis of the detected periodic structure information. The filtering is performed to eliminate further consideration of pitch values 512 of the detected periodic structure information that have low weight values. As described above, the pitch values 512 having low weight values correspond to a weak periodic structure or to noise that does not have a true periodic structure. In identifying the segment of the image that includes the periodic structure, the motion compensation controller 502 filters the pitch values 512 of the detected periodic structure information having low weight values such that these pitch values 512 do not cause false segments to be identified (i.e., portions of the image that do not include a true periodic structure that is required of all identified segments). In one example, the predefined weight threshold 506 is used to set all pitch values 512 not exceeding the predefined weight threshold 506 to a value of zero.

At 518, histograms are generated using the pitch values 512 of the periodic structure information. The histograms include counts for each of the detected pitch values 512 for the image above the threshold weight 506, and separate histograms are produced for the vertical and the horizontal pitch values. At 520, one or more segments of the image are identified using the histograms, where the segment is a portion of the image including a periodic structure. The periodic structure of the segment is of a particular pitch value or range of pitch values and is of a particular direction (i.e., periodic in the horizontal or vertical direction). The segments are identified based on a presence of one or more clusters in the histograms, where a cluster includes a range of the pitch values 512 having an elevated number of counts. The presence of multiple clusters on the histogram indicates a presence of multiple distinct segments in the image.

At 524, a mathematical operation is performed on the identified segments of the image to determine a dominant motion representation for each of the identified segments. The dominant motion representation is used to modify the motion vectors that were estimated incorrectly at 508, due to the periodic structure included in the image. Specifically, the dominant motion representation of a segment is identified using random sample consensus (RANSAC) to find an affine transform that best fits the segment. The affine transform for a particular region of the image is computed by solving the following set of simultaneous equations:

$$\begin{pmatrix} mvx_d \\ mvy_d \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix}, \quad \text{(Equation 1)}$$

where a11 and a22 are zoom parameters of the affine transform, a12 and a21 are rotation parameters of the affine transform, dx and dy are translation parameters of the affine transform, X and Y are coordinates of the particular region of the segment, $mvx_d$ is a dominant horizontal motion vector for the particular region, and $mvy_d$ is a dominant vertical motion vector for the particular region. The $mvx_d$ and the $mvy_d$ dominant motion vectors are selected from the motion vectors estimated at 508. Specifically, the $mvx_d$ and the $mvy_d$ dominant motion vectors are selected motion vectors having a highest correlation peak value on a phase plane correlation surface for each of the blocks of the segment.

In Equation 1, a11, a21, a12, a22, dx, and dy are unknown values, and $mvx_d$, $mvy_d$, X, and Y are known values. To solve for the six unknown values, in one example, three regions of the segment are selected at random, with each region including two blocks of the image (e.g., two 64 pixel×32 pixel blocks), and the set of simultaneous equations are solved to determine the unknown values. The two blocks of a selected region need not be adjacent. Solving for the six unknown values yields a single affine transform estimate. To identify the affine transform estimate that best fits the segment, in one example, a plurality of affine transform estimates are calculated in this manner. The number of affine transform estimates to be calculated may vary depending on a size of the segment, where a segment with a larger size may require a calculation of a larger number of affine transform estimates, and a segment with a smaller size may require a calculation of a smaller number of affine transform estimates.

For each of the plurality of affine transform estimates calculated, a plurality of motion vector estimate values mvx and mvy are calculated using the following equation, by inserting the a11, a12, a21, a22, dx, and dy values calculated for the affine transform estimate, and inserting X and Y values for each of the regions of the segment:

$$\begin{pmatrix} mvx \\ mvy \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix}, \quad \text{(Equation 2)}$$

The mvx and mvy values calculated using Equation 2 for each of the regions of the segment are compared to the detected $mvx_d$ and $mvy_d$ dominant motion vectors for each of the regions. A counter, indicating a number of regions within the segment that fit the estimated affine transform, is incremented if the mvx and mvy values for the affine transform estimate are within a threshold amount of the detected dominant motion vectors $mvx_d$ and $mvy_d$. The best fit affine transform is the affine transform estimate associated with a counter having a highest value (i.e., the affine transform estimate receiving a greatest number of votes).

At 526, the dominant motion representation determined at 524 is used to modify motion vectors that were incorrectly estimated at 508. In the previous step at 524, the best fit affine transform was determined for the entire segment. At 526, the best fit affine transform is applied to each of the blocks of the segment, in order to correct motion vectors that were incorrectly estimated for particular blocks. As described above, a motion vector with a highest correlation peak on a phase plane correlation surface may be selected as the dominant motion vector for a region of the segment, even though this dominant motion vector is not the true motion vector for the region. The registration of incorrect motion vectors in this manner may be the result of periodic structures present in image frames, and the incorrect motion vectors can cause visual disruptions in interpolated frames. The incorrect motion vectors can be corrected by applying the best fit affine transform for the segment to each of the blocks of the segment. True motion vectors 528 for the blocks of the segment are determined by solving for $mvx_{TMV}$ and $mvy_{TMV}$, which correspond to the true motion vectors 528 for a block:

$$\begin{pmatrix} mvx_{TMV} \\ mvy_{TMV} \end{pmatrix} = \begin{pmatrix} a11_{bf} & a12_{bf} \\ a21_{bf} & a22_{bf} \end{pmatrix} \begin{pmatrix} X \\ Y \end{pmatrix} + \begin{pmatrix} dx_{bf} \\ dy_{bf} \end{pmatrix}, \quad \text{(Equation 3)}$$

where $a11_{bf}$ and $a22_{bf}$ are zoom parameters of the best fit affine transform, $a12_{bf}$ and $a21_{bf}$ are rotation parameters of the best fit affine transform, $dx_{bf}$ and $dy_{bf}$ are translation parameters of the best fit affine transform, X and Y are coordinates of a particular region of the segment, $mvx_{TMV}$ is the true horizontal motion vector for the particular region, and $mvy_{TMV}$ is the true vertical motion vector for the particular region.

The $mvx_{TMV}$ and $mvy_{TMV}$ true motion vector values 528 may be set as the dominant motion vector for the particular region, thus correcting any of the incorrect dominant motion vectors previously determined based on the height of the correlation peaks of the phase plane correlation surface. A penalty factor may also be imposed on other motion vectors detected in the region. This may help to ensure that motion tracking of objects that are not a part of the detected periodic structure are not affected.

Figure 6:
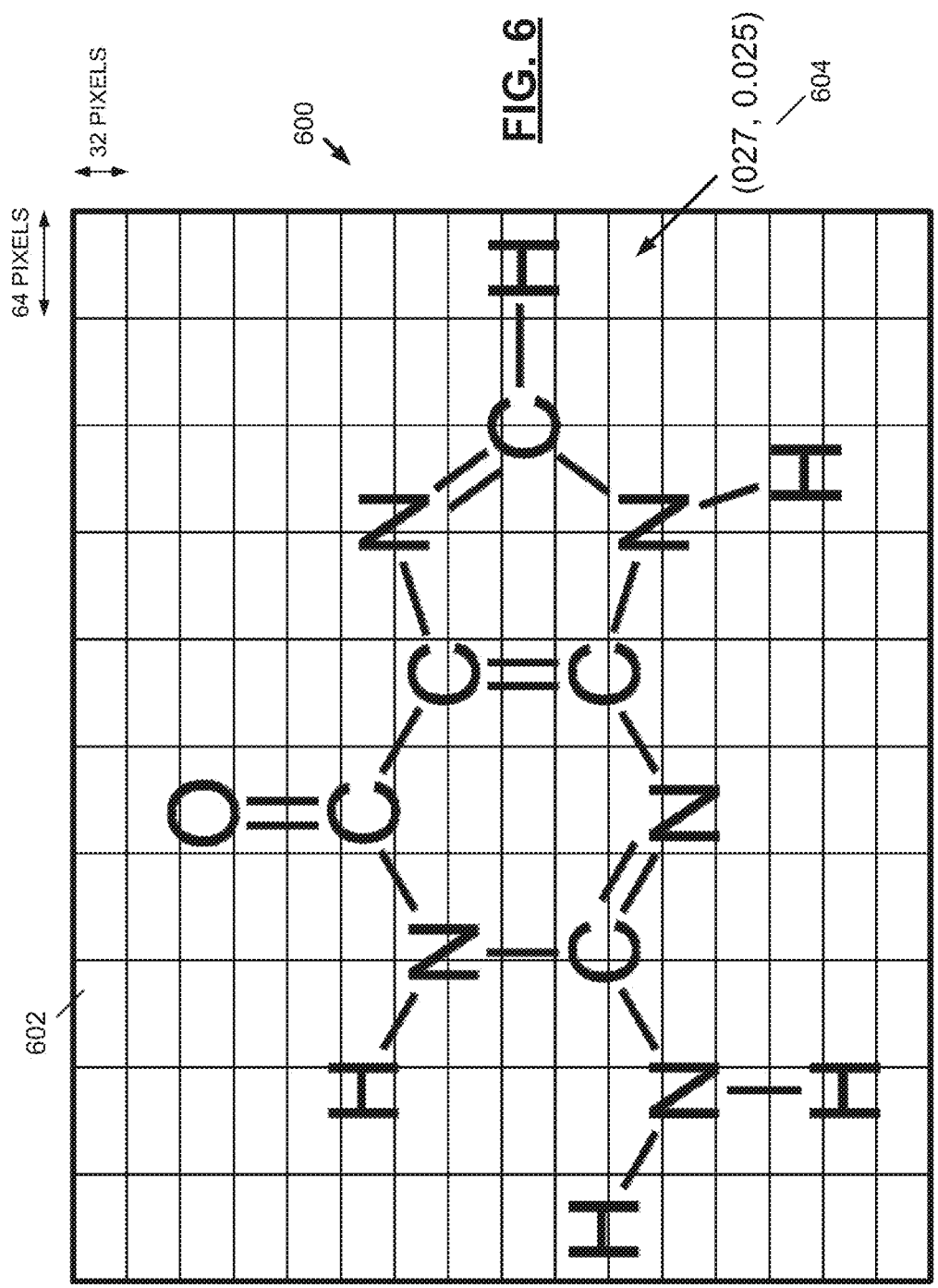
FIG. 6 depicts an image that is divided into a plurality of non-overlapping regions for a purpose of determining periodic structure information for the image.

FIG. 6 depicts an image 600 that is divided into a plurality of non-overlapping regions 602 for a purpose of determining periodic structure information 604 for the image. As described above, with reference to step 510 performed by the motion compensation controller 502 of FIG. 5, one aspect of handling periodic structures in motion compensation circuits may involve detecting periodic structure information for an image of a frame sequence. The periodic structure information may include a pitch value and a weight value (i.e., a confidence value for the pitch value), and such information may be determined for a plurality of regions of the image (i.e., all regions of the image in which a periodic pattern is detected).

To determine the periodic structure information for the image 600, the image 600 may be divided into the plurality of non-overlapping regions 602, as depicted in FIG. 6. In FIG. 6, the image 600 of a chemical bonding structure is divided into non-overlapping regions 602, where each region 602 has dimensions of 64 pixels×32 pixels. Autocorrelation values of the image 600 may be used to determine pitch and weight values 604 for a plurality of the regions 602 of the image 600. An example pair of pitch and weight values 604 included in FIG. 6, (027, 0.025), indicates a pitch of 27 pixels for a detected periodic structure and a relatively low weight value (i.e., confidence value) of 0.025 for the determined pitch. Because the image 600 features no periodic pattern in the region of the image 600 associated with the (027, 0.025) pitch and weight values 604, it is likely that the detected pitch is due to noise in the image 600. The low weight (i.e., autocorrelation) value of 0.025 signifies a very low confidence in the existence of a periodic structure. Low weight values indicate weak periodic structures or noise that inadvertently causes a false periodic structure to be detected.

More generally, the image 600 may be divided into non-overlapping regions of W×H pixels. In one example, a maximum value of a detected period is kW×kH (e.g., k=4), where the value of k uniquely identifies a region around a window of interest that is analyzed.

Figure 7:
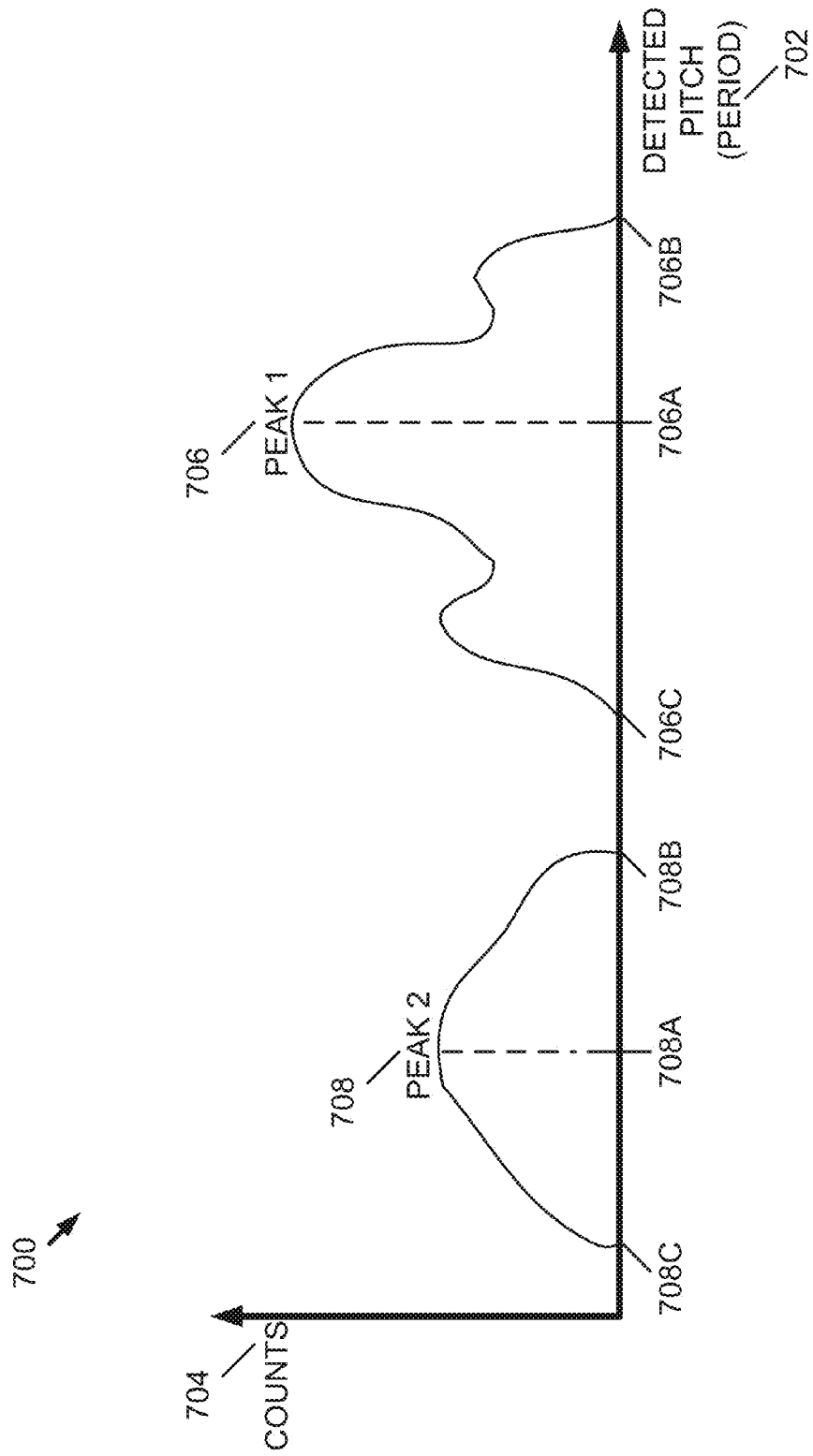
FIG. 7 is an example histogram used to identify segments of an image, where the segments include a periodic structure.

FIG. 7 is an example histogram 700 used to identify segments of an image, where the segments include a periodic structure. As described above with respect to steps 518 and 520 performed by the motion compensation controller 502 of FIG. 5, segments of an image may be identified by plotting histograms of pitch values of detected periodic structure information. The example histogram 700 of FIG. 7 depicts such a histogram, and includes an X-axis 702 indicating detected pitch values of the periodic structure information and a Y-axis 704 indicating a number of counts for each of the pitch values. The histogram 700 is constructed using the periodic structure information determined using autocorrelation values of the image, and in one example, only pitch values having associated weight values above a threshold weight value are plotted on the histogram 700. Pitch values associated with low weight values are not plotted in this example as these pitch values are likely to be a result of noise, rather than a true periodic structure.

In the example histogram 700 of FIG. 7, two peaks 706, 708 can be detected at pitch values 706A, 708A. The peaks 706, 708 are associated with clusters of pitch values, and the two clusters in the histogram 700 indicate a presence of two distinct periodic segments in the image associated with the histogram 700. The clusters include a range of pitch values having an elevated number of counts on the histogram 700. The histogram 700 has clusters of pitch values, as opposed to impulses at certain pitch values, due to aspects of the three-dimensional projection of the image onto a two-dimensional plane (camera image). For the example histogram 700 of FIG. 7, upper and lower bounds for the clusters, 706B, 708B and 706C, 708C, respectively, are determined by detecting zero crossings. In other examples, there are no zero crossings, and upper and lower bounds of clusters are determined in another manner. Because a cluster in the histogram 700 represents a segment of the image including a periodic structure, for the example of FIG. 7, two segments can be identified in the image based on the two clusters 706, 708.

Figure 8:
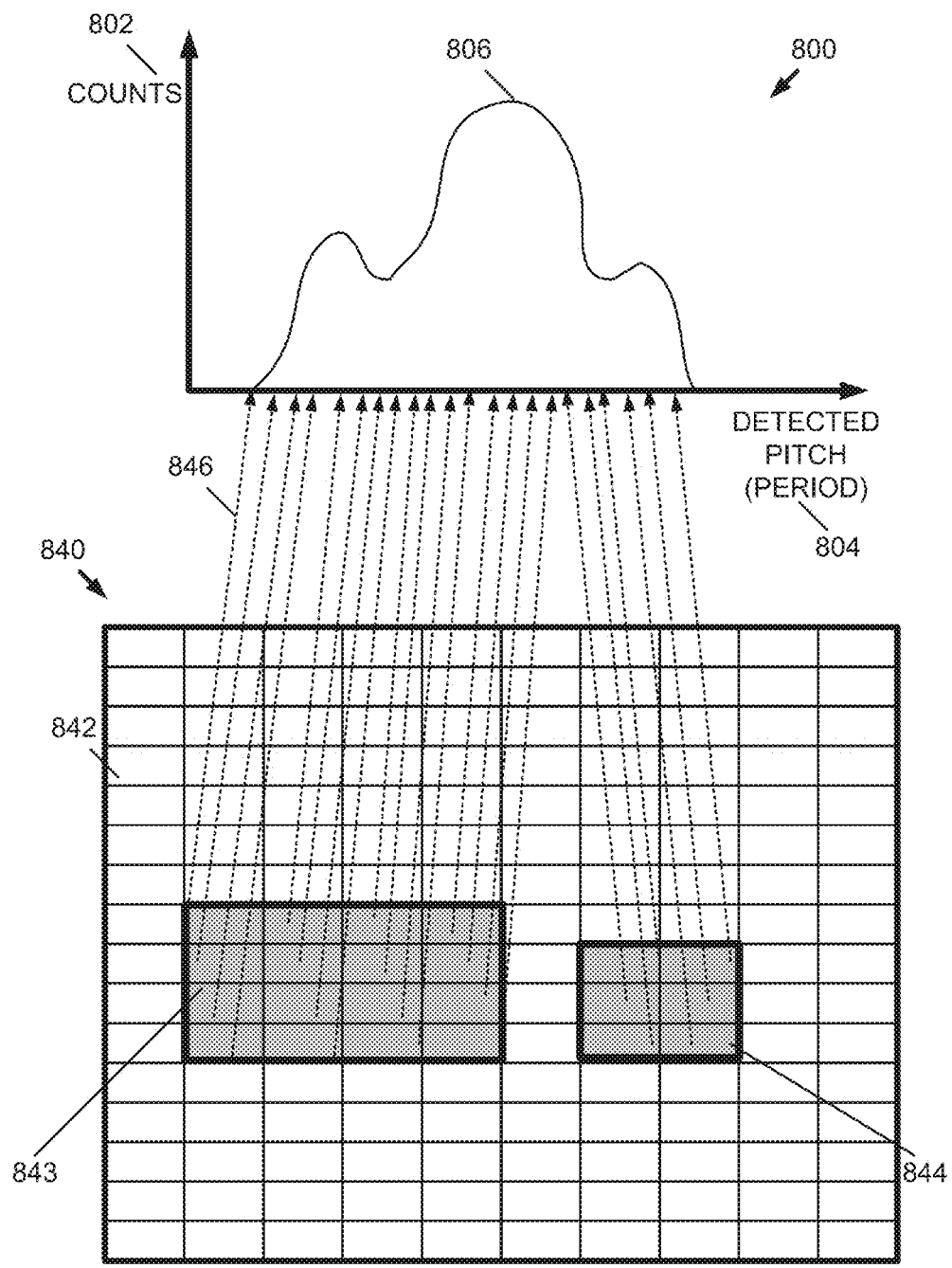
FIG. 8 illustrates use of a cluster on a histogram to identify a segment of an image.

FIG. 8 illustrates use of a cluster 806 on a histogram 800 to identify a segment of an image 840. As in FIG. 7, the histogram 800 includes an X-axis 804 indicating detected pitch values of periodic structure information for the image and a Y-axis 802 indicating a number of counts for each of the pitch values. After plotting the histogram 800 and detecting the presence of the cluster 806 indicating a segment in the image 840, information associated with the cluster 806 can be "backmapped" to the image 840 to determine a location of the segment on the image 840. In the image 840 of FIG. 8, cells 842 represent W×H regions of the image (e.g., 64 pixel×32 pixel blocks) and indicate a granularity at which the periodic structure information for the image is detected (i.e., a pitch value and a weight value are determined for certain of the cells 842 of the image 840). With the periodic structure information detected at this granularity, each count plotted on the histogram 800 can be backmapped to a particular cell 842 of the image 840. By mapping back each count plotted on the histogram 800, the segment of the image 840 can be identified.

Thus, in the example of FIG. 8, arrows 846 emanating from cells 842 illustrate the cells 842 that form the basis of the histogram 800. Cells 842 with no arrows indicate regions of the image 840 where a periodic structure is not detected or where a detected periodic structure is sufficiently weak to be considered noise and not plotted on the histogram 800. In FIG. 8, backmapping the cluster 806 identifies a single segment on the image 840, where the single segment includes non-continuous portions of the image 843, 844. Although the segment of FIG. 8 is non-continuous, both portions 843, 844 of the segment have the same periodic structure, as indicated by their association with the single cluster 806 of the histogram 800. In other examples, the segment includes a single, continuous portion of the image 840. Further, if more than one cluster is included in the histogram 800 (e.g., as depicted in the example histogram 700 of FIG. 7), multiple segments would be identified on the image 840.

Figure 9:
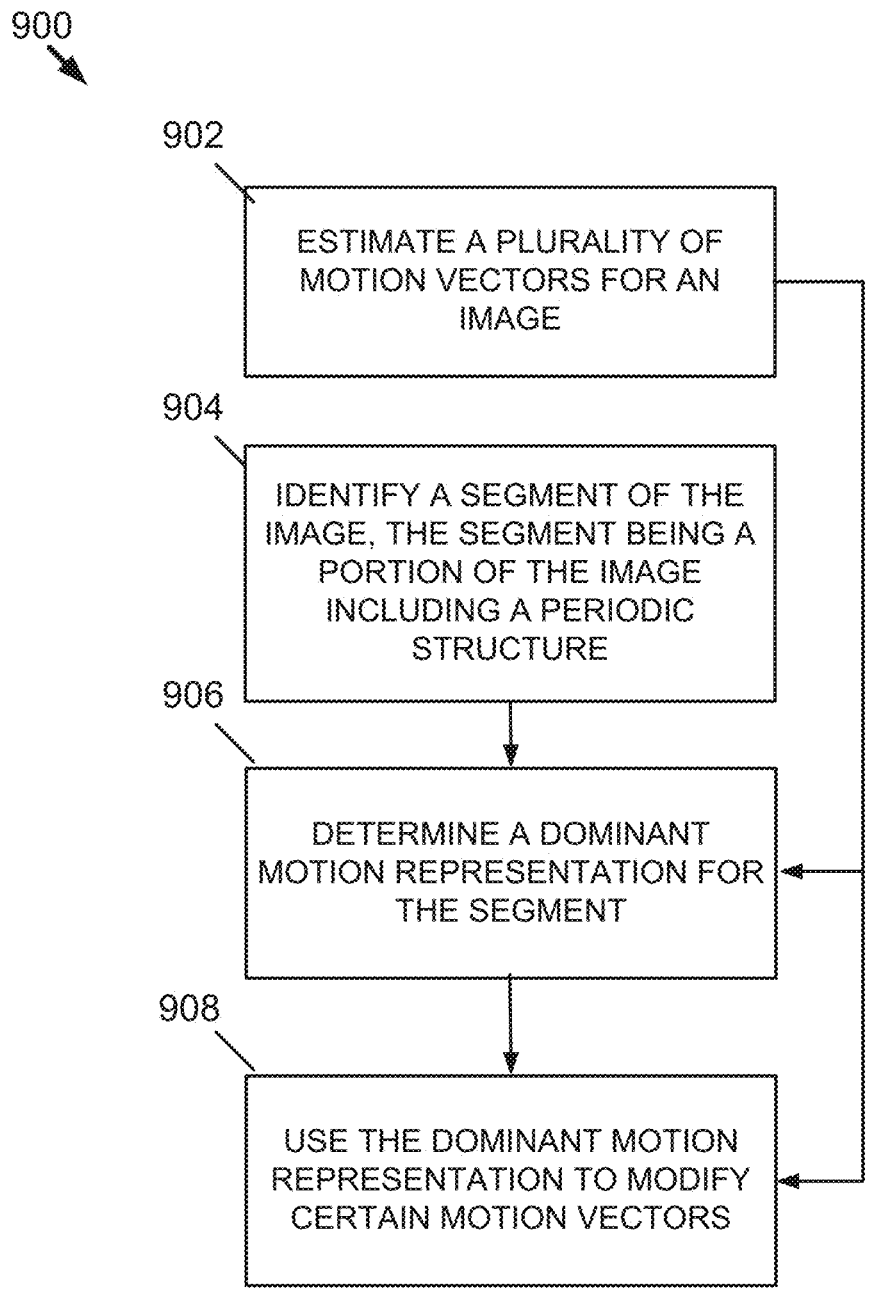
FIG. 9 is a flowchart illustrating an example method for estimating motion in an image of a video signal.

FIG. 9 is a flowchart 900 illustrating an example method for estimating motion in an image of a video signal. At 902, a plurality of motion vectors for the image are estimated. At 904, a segment of the image is identified. The segment is a portion of the image including a periodic structure. At 906, a dominant motion representation is determined for the segment. At 908, the dominant motion representation is used to modify certain motion vectors of the plurality of motion vectors.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

What is claimed is:

1. A method of identifying a segment of an image, the method comprising:
   detecting periodic structure information for the image using autocorrelation values of the image, the periodic structure information including a pitch value and a weight value for each of a plurality of regions of the image;
   plotting a histogram of the pitch values of the plurality of the regions of the image, the pitch values plotted in the histogram being those having associated weight values above a threshold weight value;
   determining a cluster on the histogram, the cluster including a range of the pitch values having an elevated number of counts on the histogram; and
   identifying the segment based on the cluster, the segment being a portion of the image including a periodic structure;
   wherein the detecting, the plotting, the determining, and the identifying are performed by a processor-based system.

2. The method of claim 1, further comprising:
   estimating a plurality of motion vectors for the image;
   determining a dominant motion representation of the segment; and
   using the dominant motion representation to modify certain motion vectors of the plurality of motion vectors;
   wherein each weight value indicates a confidence in the corresponding pitch.

3. The method of claim 2, further comprising:
   determining the dominant motion representation of the segment, wherein the determining includes using random sample consensus (RANSAC) to compute an affine transform that best fits the segment, and wherein the affine transform that best fits the segment is used to modify the certain motion vectors of the plurality of motion vectors.

4. The method of claim 3, further comprising:
   computing the affine transform that best fits the segment, wherein the computing includes solving an equation:

$$\begin{pmatrix} mvx_d \\ mvy_d \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix},$$

where a11 and a22 are zoom parameters of an affine transform, a12 and a21 are rotation parameters of the affine transform, dx and dy are translation parameters of the affine transform, X and Y are coordinates of a particular region of the segment, $mvx_d$ is a dominant horizontal motion vector for the particular region, and $mvy_d$ is a dominant vertical motion vector for the particular region, and wherein the $mvx_d$ and the $mvy_d$ dominant motion vectors are selected from the estimated plurality of motion vectors.

5. The method of claim 2, further comprising:
producing an interpolated image related to the image using the modified certain motion vectors.

6. A method for estimating motion in an image of a video signal, the method comprising:
estimating a plurality of motion vectors for the image;
identifying a segment of the image, the segment being a portion of the image including a periodic structure;
determining a dominant motion representation of the segment, wherein the determining includes using random sample consensus (RANSAC) to compute an affine transform that best fits the segment, and wherein the affine transform that best fits the segment is used to modify the certain motion vectors of the plurality of motion vectors; and
using the dominant motion representation to modify certain motion vectors of the plurality of motion vectors; and
computing the affine transform that best fits the segment, the computing including:
solving an equation:

$$\begin{pmatrix} mvx_d \\ mvy_d \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix},$$

where a11 and a22 are zoom parameters of an affine transform, a12 and a21 are rotation parameters of the affine transform, dx and dy are translation parameters of the affine transform, X and Y are coordinates of a particular region of the segment, $mvx_d$ is a dominant horizontal motion vector for the particular region, and $mvy_d$ is a dominant vertical motion vector for the particular region, and wherein the $mvx_d$ and the $mvy_d$ dominant motion vectors are selected from the estimated plurality of motion vectors; and
calculating a plurality of affine transform estimates for the segment using the equation;
determining predicted horizontal and vertical motion vectors mvx and mvy, respectively, for each of the calculated affine transform estimates;
comparing the mvx and the mvy predicted motion vectors to the $mvx_d$ and the $mvy_d$ dominant motion vectors; and
counting a number of votes for each of the plurality of the affine transform estimates based on the comparing, a vote indicating that the mvx and the mvy predicted motion vectors are within a threshold amount of the $mvx_d$ and the $mvy_d$ dominant motion vectors, wherein the affine transform that best fits the segment is the affine transform estimate with a maximum number of votes;
wherein the estimating, the identifying, the determining, the using, and the computing are performed by a processor-based system.

7. The method of claim 6, further comprising:
calculating the plurality of the affine transform estimates for the segment by selecting a plurality of regions of the segment at random and solving the equation.

8. The method of claim 6, further comprising:
modifying the certain motion vectors of the plurality of motion vectors, the modifying including:
detecting a true motion vector for each of a plurality of regions of the segment by solving a second equation:

$$\begin{pmatrix} mvx_{TMV} \\ mvy_{TMV} \end{pmatrix} = \begin{pmatrix} a11_{bf} & a12_{bf} \\ a21_{bf} & a22_{bf} \end{pmatrix} \begin{pmatrix} X \\ Y \end{pmatrix} + \begin{pmatrix} dx_{bf} \\ dy_{bf} \end{pmatrix},$$

where $mvx_{TMV}$ is a true horizontal motion vector for a region of the plurality of the regions, $mvy_{TMV}$ is a true vertical motion vector for the region, $a11_{bf}$ and $a22_{bf}$ are zoom parameters for the affine transform that best fits the segment, $a12_{bf}$ and $a21_{bf}$ are rotation parameters for the affine transform that best fits the segment, dx and dy are translation parameters for the affine transform that best fits the segment, and X and Y are coordinates of the region.

9. A system for estimating motion in an image of a video signal, the system comprising:
a processor-based motion vector estimation block configured to estimate a plurality of motion vectors for the image;
a processor-based segment identification block configured to identify a segment of the image, the segment being a portion of the image including a periodic structure; and
a processor-based dominant motion detection block configured to determine a dominant motion representation of the segment, the dominant motion representation being used to modify certain motion vectors of the plurality of motion vectors;
wherein the dominant motion detection block uses random sample consensus (RANSAC) to compute an affine transform that best fits the segment, and wherein the affine transform that best fits the segment is used to modify the certain motion vectors of the plurality of motion vectors;
wherein computing the affine transformation that best fits the segment includes:
solving an equation:

$$\begin{pmatrix} mvx_d \\ mvy_d \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix},$$

where a11 and a22 are zoom parameters of an affine transform, a12 and a21 are rotation parameters of the affine transform, dx and dy are translation parameters of the affine transform, X and Y are coordinates of a particular region of the segment, $mvx_d$ is a dominant horizontal motion vector for the particular region, and $mvy_d$ is a dominant vertical motion vector for the particular region, and wherein the $mvx_d$ and the $mvy_d$ dominant motion vectors are selected from the estimated plurality of motion vectors;
calculating a plurality of affine transform estimates for the segment using the equation;
determining predicted horizontal and vertical motion vectors mvx and mvy, respectively, for each of the calculated affine transform estimates;
comparing the mvx and the mvy predicted motion vectors to the $mvx_d$ and the $mvy_d$ dominant motion vectors; and
counting a number of votes for each of the plurality of the affine transform estimates based on the comparing, a vote indicating that the mvx and the mvy predicted motion vectors are within a threshold amount of the $mvx_d$ and the $mvy_d$ dominant motion vectors, wherein the affine transform that best fits the segment is the affine transform estimate with a maximum number of votes.

10. The system of claim 9, wherein the dominant motion detection block calculates the plurality of the affine transform estimates for the segment by selecting a plurality of regions of the segment at random and solving the equation.

11. The system of claim 9, wherein the dominant motion detection block modifies the certain motion vectors of the plurality of motion vectors by detecting a true motion vector for each of a plurality of regions of the segment by solving a second equation:

$$\begin{pmatrix} mvx_{TMV} \\ mvy_{TMV} \end{pmatrix} = \begin{pmatrix} a11_{bf} & a12_{bf} \\ a21_{bf} & a22_{bf} \end{pmatrix} \begin{pmatrix} X \\ Y \end{pmatrix} + \begin{pmatrix} dx_{bf} \\ dy_{bf} \end{pmatrix},$$

where $mvx_{TMV}$ is a true horizontal motion vector for a region of the plurality of the regions, $mvy_{TMV}$ is a true vertical motion vector for the region, $a11_{bf}$ and $a22_{bf}$ are zoom parameters for the affine transform that best fits the segment, $a12_{bf}$ and $a21_{bf}$ are rotation parameters for the affine transform that best fits the segment, dx and dy are translation parameters for the affine transform that best fits the segment, and X and Y are coordinates of the region.

12. A system for estimating motion in an image of a video signal, the system comprising:
a processor-based periodic structure detection block configured to detect periodic structure information for the image using autocorrelation values of the image, the periodic structure information including a pitch value and a weight value for each of a plurality of regions of the image;
a processor-based segment identification block configured to:
plot a histogram of the pitch values of the plurality of the regions of the image, the pitch values plotted in the histogram being those having associated weight values above a threshold weight value;
determine a cluster on the histogram, the cluster including a range of the pitch values having an elevated number of counts on the histogram; and
identify the segment based on the cluster, the segment being a portion of the image including a periodic structure.

13. The system of claim 12, further comprising:
a processor-based motion vector estimation block configured to estimate a plurality of motion vectors for the image; and
a processor-based dominant motion detection block configured to determine a dominant motion representation of the segment, for the dominant motion representation to be used to modify certain motion vectors of the plurality of motion vectors;
wherein each weight value indicates a confidence in the corresponding pitch.

14. The system of claim 13, wherein the dominant motion detection block modifies the certain motion vectors of the plurality of motion vectors to produce an interpolated image related to the image.

15. The system of claim 13, wherein the dominant motion detection block modifies the certain motion vectors of the plurality of motion vectors in a video compression procedure.

16. The system of claim 13, wherein the dominant motion detection block uses random sample consensus (RANSAC) to compute an affine transform that best fits the segment, and wherein the affine transform that best fits the segment is used to modify the certain motion vectors of the plurality of motion vectors.

17. The system of claim 16, wherein computing the affine transformation that best fits the segment includes solving an equation:

$$\begin{pmatrix} mvx_d \\ mvy_d \end{pmatrix} = \begin{pmatrix} a11 & a12 \\ a21 & a22 \end{pmatrix} \begin{pmatrix} X \\ Y \end{pmatrix} + \begin{pmatrix} dx \\ dy \end{pmatrix},$$

where a11 and a22 are zoom parameters of an affine transform, a12 and a21 are rotation parameters of the affine transform, dx and dy are translation parameters of the affine transform, X and Y are coordinates of a particular region of the segment, $mvx_d$ is a dominant horizontal motion vector for the particular region, and $mvy_d$ is a dominant vertical motion vector for the particular region, and wherein the $mvx_d$ and the $mvy_d$ dominant motion vectors are selected from the estimated plurality of motion vectors.

* * * * *